(12) United States Patent
Schüler

(10) Patent No.: US 8,298,110 B2
(45) Date of Patent: Oct. 30, 2012

(54) GEAR TRAIN FOR AN ACTUATOR

(75) Inventor: Rolf Schüler, Heiligenhaus (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 1005 days.

(21) Appl. No.: 12/291,976

(22) Filed: Nov. 14, 2008

(65) Prior Publication Data

US 2009/0078066 A1 Mar. 26, 2009

Related U.S. Application Data

(63) Continuation of application No. PCT/EP2007/003885, filed on May 3, 2007.

(30) Foreign Application Priority Data

May 19, 2006 (DE) .......................... 10 2006 023 535

(51) Int. Cl.
 *F16H 1/32* (2006.01)
(52) U.S. Cl. ......................................... 475/180
(58) Field of Classification Search .................. None
 See application file for complete search history.

(56) References Cited

U.S. PATENT DOCUMENTS

| | | | | |
|---|---|---|---|---|
| 1,158,458 A * | 11/1915 | Dey | ............................... | 475/174 |
| 2,932,992 A * | 4/1960 | Larsh | ............................... | 475/176 |
| 2,972,910 A * | 2/1961 | Menge, Sr. | ............................... | 475/177 |
| 3,020,782 A * | 2/1962 | Sacchi | ............................... | 475/166 |
| 3,037,400 A * | 6/1962 | Sundt | ............................... | 475/180 |
| 3,160,032 A * | 12/1964 | Black | ............................... | 475/180 |
| 3,217,566 A * | 11/1965 | Sanson | ............................... | 475/175 |
| 3,389,618 A * | 6/1968 | McDermott | ............................... | 475/168 |
| 3,424,036 A * | 1/1969 | Colgan | ............................... | 475/180 |
| 3,496,802 A * | 2/1970 | Arnold et al. | ............................... | 475/180 |
| 3,757,608 A * | 9/1973 | Willner | ............................... | 475/347 |
| 3,784,336 A * | 1/1974 | Schultz | ............................... | 418/61.3 |

(Continued)

FOREIGN PATENT DOCUMENTS

CN 1096570 12/1994

(Continued)

OTHER PUBLICATIONS

Office Action from corresponding Chinese Application No. 200780018382.9 issued Oct. 20, 2010.

(Continued)

*Primary Examiner* — Dirk Wright

(74) *Attorney, Agent, or Firm* — Womble Carlyle Sandridge & Rice, LLP

(57) ABSTRACT

In a gear train (10, 30) for an actuator, in particular of a vehicle seat (2), the gear train comprises a drive (11) that can be rotated about a rotational axis (A), at least one eccentric cam (12, 13) that is driven by the drive (11), a pinion (14, 15) that is driven by the eccentric cam (12, 13), a gear ring (16), which meshes with the pinion (14, 15) and in relation to which the pinion (14, 15) executes a rolling motion that defines a point of rolling contact (W), and a take-off drive (18) that taps the relative rolling motion. At least some sections of the material of the pinion (14, 15) and/or the ring gear (16) in the vicinity of the point of rolling contact (W) are elastically deformable, in order to produce surface contact at the point of rolling contact (W).

10 Claims, 4 Drawing Sheets

U.S. PATENT DOCUMENTS

| | | | | |
|---|---|---|---|---|
| 3,846,051 | A * | 11/1974 | McDermott | 418/61.3 |
| 4,020,717 | A * | 5/1977 | Johnson | 475/177 |
| 4,041,808 | A * | 8/1977 | Fickelscher | 475/164 |
| 4,099,427 | A * | 7/1978 | Fickelscher | 475/176 |
| 4,177,695 | A * | 12/1979 | Grove | 475/177 |
| 4,196,931 | A | 4/1980 | Werner | |
| 4,228,698 | A | 10/1980 | Winiasz | |
| 4,282,777 | A * | 8/1981 | Ryffel et al. | 475/159 |
| 4,302,047 | A | 11/1981 | Esser | |
| 4,407,544 | A * | 10/1983 | Bahring | 297/362 |
| 4,634,181 | A * | 1/1987 | Pipon | 297/362 |
| 4,667,539 | A * | 5/1987 | Fickelscher | 475/176 |
| 4,668,013 | A * | 5/1987 | Wahlmann | 297/362 |
| 4,715,656 | A * | 12/1987 | Walk et al. | 297/362 |
| 4,770,062 | A * | 9/1988 | Minegishi | 475/177 |
| 4,781,416 | A | 11/1988 | Johnson et al. | |
| 4,887,863 | A * | 12/1989 | Caillol | 297/362 |
| 4,986,602 | A * | 1/1991 | Blanchard | 297/362 |
| 5,005,906 | A * | 4/1991 | Suzuki et al. | 297/362 |
| 5,209,637 | A * | 5/1993 | Reubeuze | 475/176 |
| 5,308,294 | A * | 5/1994 | Wittig et al. | 475/162 |
| 5,398,904 | A | 3/1995 | Rees | |
| 5,611,747 | A * | 3/1997 | Bauer et al. | 475/162 |
| 5,634,689 | A | 6/1997 | Putsch et al. | |
| 5,707,310 | A * | 1/1998 | Maeguchi et al. | 475/180 |
| 5,820,504 | A * | 10/1998 | Geralde | 475/177 |
| 5,954,610 | A * | 9/1999 | Kamimura | 475/180 |
| 6,014,907 | A * | 1/2000 | Rilbe | 74/395 |
| 6,619,743 | B1 | 9/2003 | Scholz et al. | |
| 2002/0025875 | A1 * | 2/2002 | Tsujioka | 475/162 |
| 2004/0087411 | A1 | 5/2004 | Minegishi et al. | |
| 2007/0029893 | A1 | 2/2007 | Schuler et al. | |
| 2008/0146394 | A1 | 6/2008 | Schüler et al. | |

FOREIGN PATENT DOCUMENTS

| | | |
|---|---|---|
| DE | 21 30 873 | 1/1973 |
| DE | 28 49 542 A1 | 5/1980 |
| DE | 44 36 101 A1 | 6/1995 |
| DE | 199 38 666 A1 | 2/2001 |
| DE | 102 32 247 B3 | 3/2004 |
| DE | 10 2004 019 466 A1 | 11/2005 |
| EP | 0 450 324 B1 | 10/1991 |
| GB | 2 229 510 A | 9/1990 |
| JP | S52-062778 | 5/1977 |
| JP | H4-36146 | 3/1992 |
| JP | 2004-44685 | 2/2004 |
| JP | 2005-201310 | 7/2005 |
| WO | WO 2007/022909 A2 | 3/2007 |

OTHER PUBLICATIONS

Translation of Notification of Reason for Refusal from corresponding Japanese Patent Application No. 2009-510317 dispatched May 29, 2012.

* cited by examiner

US 8,298,110 B2

GEAR TRAIN FOR AN ACTUATOR

CROSS-REFERENCE TO RELATED APPLICATION

The present application is a continuation of International Application PCT/EP2007/003885, which was filed May 3, 2007. The entire disclosure of International Application PCT/EP2007/003885, which was filed May 3, 2007, is incorporated herein by reference.

TECHNICAL FIELD

The present invention relates to a gear train for an actuator, in particular of a vehicle seat, comprising a drive for being rotated about a rotational axis; at least one eccentric for being driven by the drive; a ring gear; a pinion that is meshed with the ring gear and is for being driven by the eccentric so that, relative to the ring gear, the pinion carries out a rolling motion defining a point of rolling contact; and an output for rotating in response to the rolling motion of the pinion.

BACKGROUND

A gear train of the type described in the Technical Field section of this disclosure is known from DE 28 49 542 A1. The gear train of DE 28 49 542 A1 is used as a load-bearing gear unit in a backrest inclination adjuster. The pinion and the ring gear are, therefore, respectively formed on a fitting and are driven by a manually driven eccentric for the relative rolling motion thereof. The tooth geometries partially incorporate an arcuate cycloid.

BRIEF SUMMARY OF SOME ASPECTS OF THE INVENTION

An object of the present invention is the provision of improvements to a gear train of the type described in the Technical Field section of this disclosure. In accordance with one aspect of the present invention, a gear train for an actuator in a vehicle, in particular a gear train for an actuator of a vehicle seat, comprises a drive for being rotated about a rotational axis; at least one eccentric for being driven by the drive; a ring gear; a pinion that is meshed with the ring gear and is for being driven by the eccentric so that, relative to the ring gear, the pinion carries out a rolling motion defining a point of rolling contact; and an output for rotating in response to the rolling motion of the pinion, wherein the pinion's material that is proximate the point of rolling contact is at least partially elastically deformable and/or the ring gear's material that is proximate the point of rolling contact is at least partially elastically deformable, so that there is surface contact at the point of rolling contact.

Because the material of the pinion and/or the ring gear in the region of the point of rolling contact is at least partially elastically deformable, a surface contact (e.g., a broad area of contact) is generated at the point of rolling contact, by way of which large lubricating gap lengths and small lubricating gap thicknesses are achieved for a highly viscous lubricant film on the components, which markedly improves the damping effect of the lubricant film. Where there is a small space requirement, a high gear ratio is achieved. Without the elastic deformation of the material according to the exemplary embodiment of the invention, there would be substantially only one point or line contact at the point of rolling contact.

The region of the rolling contact is the region of the pinion and/or the ring gear where the two components mesh with one another, i.e. preferably the region of the toothing. Apart from the rolling contact itself which is planar, the directly adjacent material region, i.e. the radially externally located region of the pinion and/or the radially internally located region of the ring gear, forms part of the region of the rolling contact. The radial depth of the region relative to the rolling contact depends on the material selected and the geometric and elastic properties thereof, i.e. the possible depth of deformation in the material due to the forces present at the point of rolling contact.

In order to produce the partial elastic deformation, the pinion, on the one hand, and the ring gear, on the other hand, may consist at least partially of different material, so that at the point of rolling contact a variable resilience and thus material displacement occurs. For example, the pinion and/or the ring gear may be configured from plastics, and in particular may be produced as a plastics injection-molded part, while the other component is less resilient and, for example, consists of metal. It is also possible that the pinion and/or the ring gear comprise recesses in the material, which increase the resilience of the material and at the same time receive the elastically displaced material. It is, however, also possible that the pinion and/or the ring gear are mounted in a resilient bed, which ensures the resilience. The partial use of a cycloid or approximately cycloid shape as the tooth geometry with a similar curvature and the resulting convex-concave support simplifies the configuration of the surface contact.

During operation, and also with regard to local stresses and wear, it is advantageous if eccentricities of motion and asymmetries of bearing forces as a result of the operation are compensated for. Thus, compensation of the wobbling portion of the rolling motion when transmitted to the output is carried out by a circular sliding gear or a compensation stage with a gear ratio of one. In particular by way of the circular sliding gear, the output may be acted upon approximately symmetrically, by two pinions that are mounted eccentrically relative to the rotational axis, are offset relative to one another in the peripheral direction by 180°, are axially adjacent to one another, and that both cooperate with the common ring gear and the common output.

For tapping (e.g., harnessing) the rolling motion by the output, preferably a circular sliding gear (surface pressure gear) with guide elements is provided for the pinion, as is disclosed for example in U.S. Pat. No. 4,228,698 A, or alternatively an Oldham coupling (double slider crank mechanism) is provided, as is disclosed for example in EP 0 450 324 B1.

In order to achieve a greater reduction between the motor speed and the speed of the output, two gear trains may be arranged in series. The two gear trains may be axially and/or radially nested. Coaxial rotations of the drive and output of the gear trains require no compensation elements and allow simple bearing ratios. Accordingly, the eccentrics may be formed on the respective outputs of the preceding gear trains, i.e. integrally configured therewith, which also reduces the number of components required.

When the eccentric is defined by at least one rolling body, which is respectively in contact with (or may be indirectly in contact with) a round geometry of the drive and a round geometry of the pinion, and rolls therebetween, a simple eccentric is produced which, by way of the rolling body and as a result of rolling friction (i.e. substantially devoid of friction), transmits the drive motion with a high degree of efficiency. During this rolling motion, therefore, the drive, rolling body and pinion rotate relative to one another. In the relative system of the pinion, the rolling body is only able to follow the drive at half speed due to the mutual rolling, i.e. the eccentric rotates only approximately half as rapidly as the drive. Thus the eccentric already represents per se a gear train with a gear ratio of at least two. One or more rolling bodies, in particular balls, cylindrical rollers or hollow cylinders, may be provided. In the radial sequence in the region of the eccentric, a further component, for example a ring, may be arranged on which the contact takes place and which, for example, may carry out a compensating motion.

The gear train according to the invention may be combined with a brush commutated motor or electronically commutated motor, to which the gear train is attached on the output side, to form a motorized actuator. A preferably common housing of the motorized actuator may be of sealed construction, possibly by including covers or the like, which allows easy handling of the motorized actuator in a dipping bath.

Such a motorized actuator may, for example, be incorporated in a load-bearing gear unit of an adjuster of a vehicle seat. Due to the high step-down ratio, the load-bearing gear unit may be prevented from wearing out by a wrap-spring brake or the like on the rotor, if required. A hollow shaft construction allows a simple connection of a transmission rod between both sides of the vehicle seat, preferably by a profiled central receiver in the drive component for the load-bearing gear unit, i.e. in the exemplary embodiment in the output of the gear train.

Other aspects and advantages of the present invention will become apparent from the following.

BRIEF DESCRIPTION OF THE DRAWINGS

The invention is described in more detail hereinafter with reference to an exemplary embodiment and modifications thereof shown in the drawings, in which.

DETAILED DESCRIPTION

Figure 1:
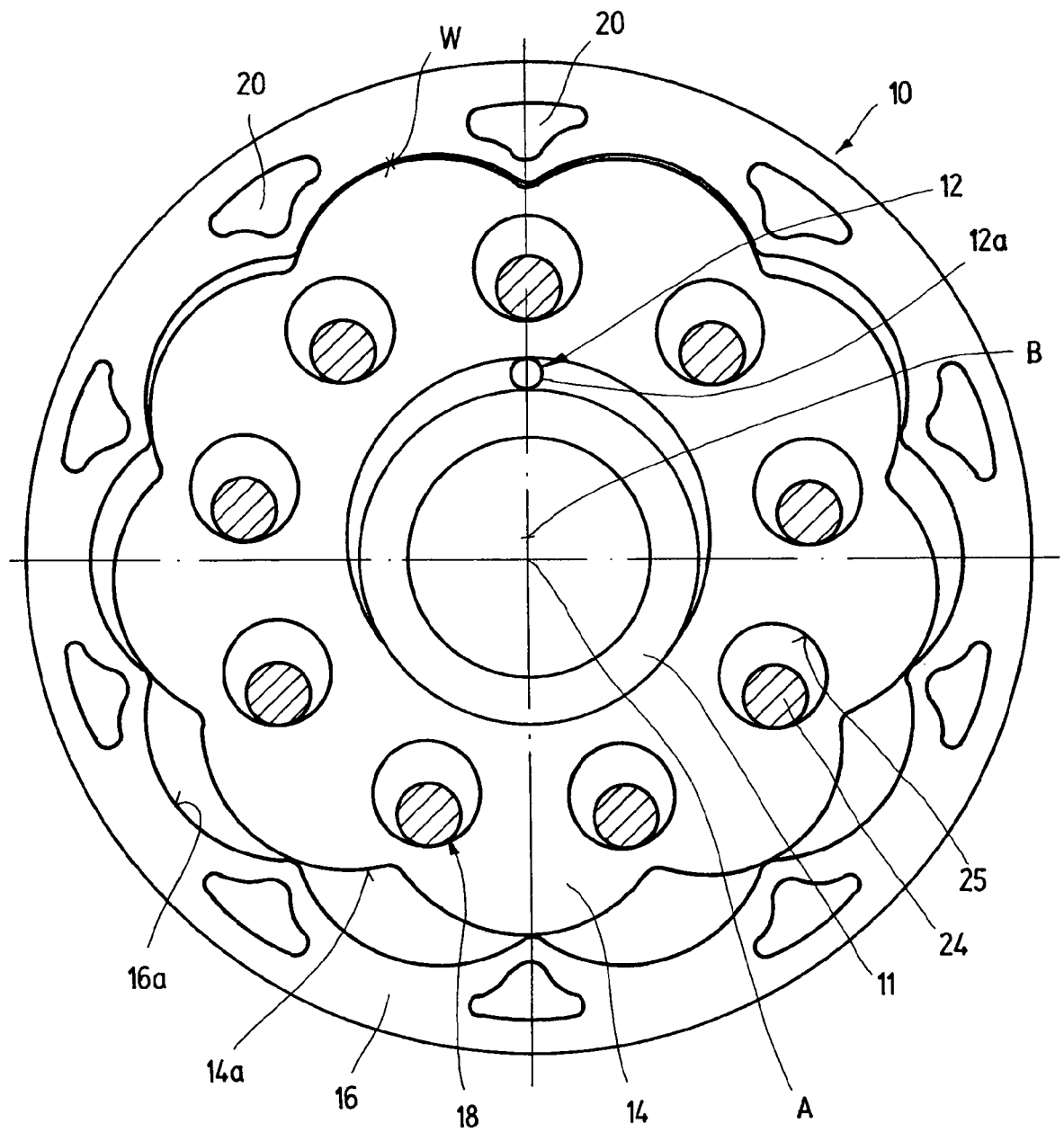
FIG. 1 shows a cross section through the exemplary embodiment along the line I-I in FIG. 2.

A motorized actuator 1 of a vehicle seat 2, for example of a motor vehicle, comprises a motor 5 and at least one gear train 10 attached to the output side of the motor 5. The (first) gear train 10 comprises: a drive 11 that is attached to the motor 5, configured as a hollow shaft, and rotatable about a rotational axis A; a first eccentric 12 driven by the drive 11; a second eccentric 13 coupled to the first eccentric 12 for rotating therewith; a first pinion 14 driven by the first eccentric 12; a second pinion 15 driven by the second eccentric 13; a ring gear 16; and an output 18. The rotational axis A defines the following directional information used in this disclosure.

The two eccentrics 12 and 13 may respectively be fixed eccentrics. For each of these two fixed eccentrics, the fixed eccentric is located fixedly in terms of rotating with the drive 11, with the (radial) inner face of the fixed eccentric being on the (radial) outer face of the drive 11, and the radial outer face of the fixed eccentric sliding along the radial inner face of the associated pinion 14 or 15 (respectively). Such a fixed eccentric is disclosed in DE 28 49 542 A1, the entire disclosure of which is incorporated herein by reference. The eccentrics 12 and 13 may also be defined by a wedge system, as is disclosed in DE 44 36 101 A1, the entire disclosure of which is incorporated herein by reference.

In FIG. 1, the first eccentric 12 is defined by a rolling body 12a, for example a ball, a cylindrical roller or a hollow cylinder. On the one hand, the rolling body 12a is located at one point of the periphery of the drive 11, on the outer face of the drive 11, and rolls on the drive 11. On the other hand, the rolling body 12a rolls in an annular groove along the inner face of the first pinion 14. As a result, the center point of the first pinion 14 is located on an eccentric axis B, which is offset from, parallel to, and rotates around the rotational axis A. The rotation of the eccentric axis B around the rotational axis A is at a rotational speed which is less than half of the rotational speed of the drive 11.

Figure 8:
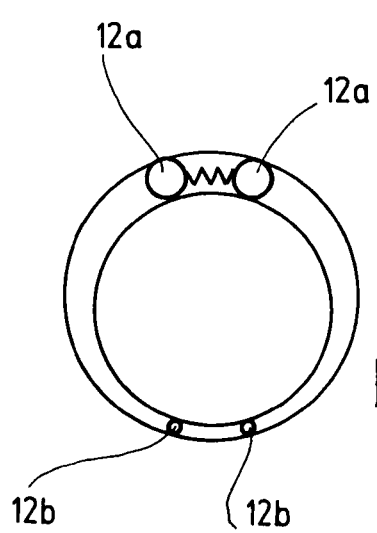
FIG. 8 shows a schematic representation of a modification comprising an improved rolling eccentric.

The above-mentioned rolling eccentric, which is defined by the rolling body 12a, thus forms a gear train with a gear ratio of at least two, with the efficiency thereof being very high due to the pure rolling contact. The above-mentioned rolling eccentric, which is defined by the rolling body 12a, also simultaneously serves as a bearing for the first pinion 14. The exemplary embodiment shown in FIG. 1, in which the radial forces acting on the rolling body 12a for its frictionless (e.g., substantially frictionless) rolling are produced by the radial forces of the first pinion 14 at the point of the external rolling contact W, represents only the basic principle. FIG. 8 shows a preferred improvement, in which the "rolling eccentric—gear train" is implemented as a closed functional unit with internal force management (e.g., a spring), by two rolling bodies 12a pretensioned against one another (e.g., biased away from one another) being used between the round rolling geometries and the radial forces being absorbed in an opposing manner by further rolling bodies 12b.

Figure 2:
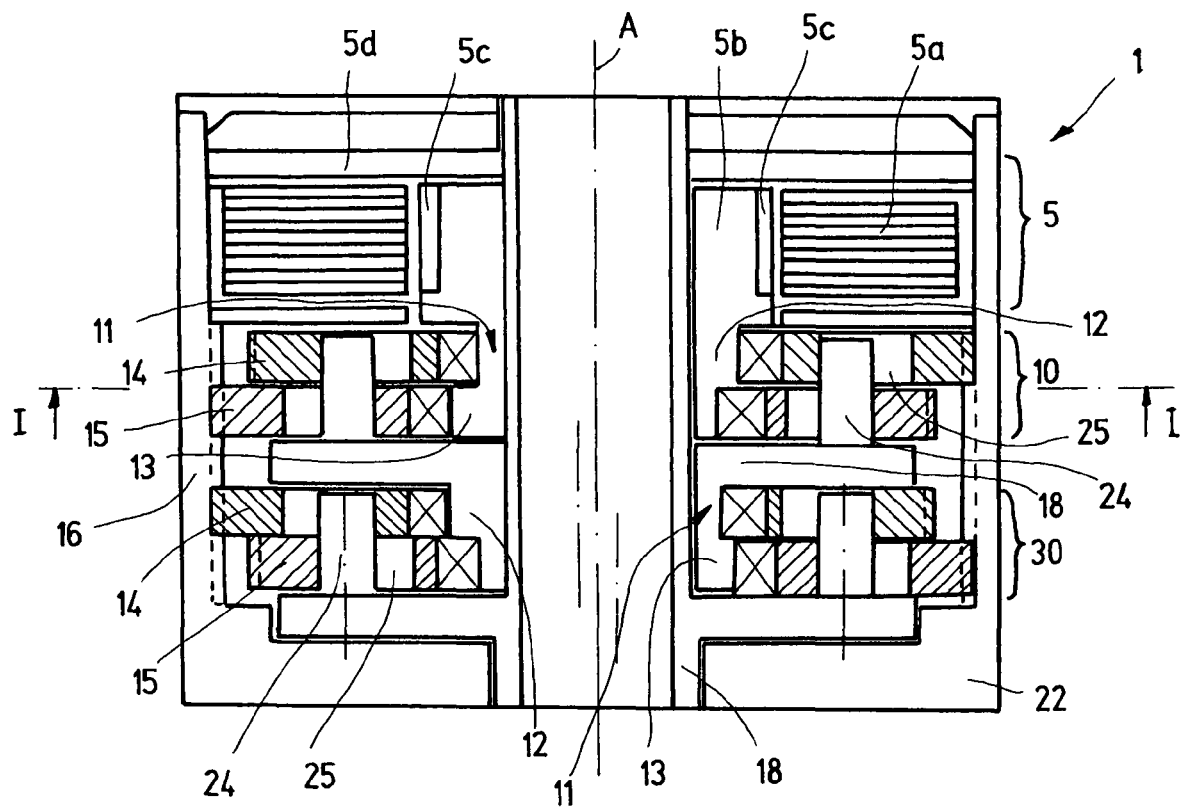
FIG. 2 shows a longitudinal section through the exemplary embodiment used in a motorized actuator.
Figure 3:
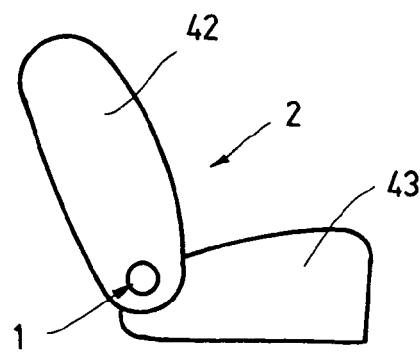
FIG. 3 shows a schematic side view of a vehicle seat.
Figure 4:
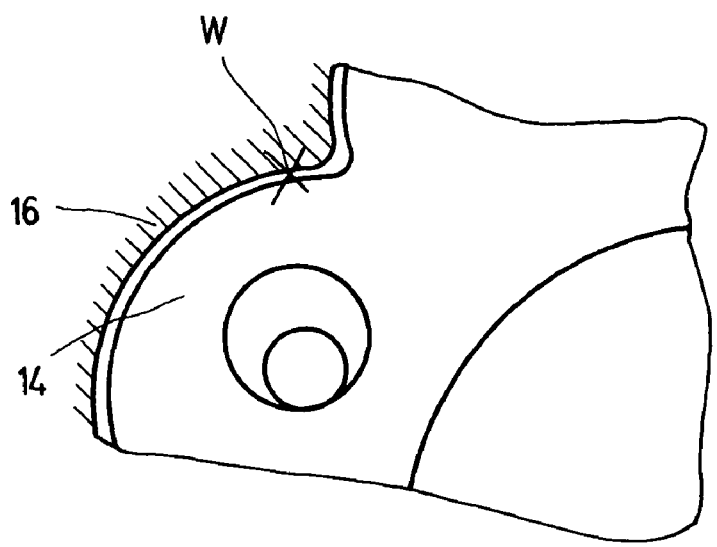
FIG. 4 shows an enlarged, schematic partial view of FIG. 1.

Any combinations of the aforementioned types of eccentric are possible. A preferred bearing of the pinions 14 and 15 on the eccentrics 12 and 13 by way of a plain bearing, ball bearing or rolling bearing is schematically shown in FIG. 2. With such a bearing arrangement, the rolling contact W is moved to a separately configured component. In the exemplary embodiment, the two eccentrics 12 and 13 are located in a fixed phase relationship with one another and are offset relative to one another about the rotational axis A in the peripheral direction by 180°, and arranged fixedly in terms of rotation relative to one another. The pinions 14, 15 are eccentrically mounted relative to the rotational axis A (i.e., they are driven by the eccentrics 12, 13), are arranged axially adjacent to one another, and carry out movements offset relative to one another by 180°; therefore, initially only the motion of the first pinion 14 is described in the following.

The first pinion 14 carries out a rolling motion on the ring gear 16. In the exemplary embodiment, the ring gear 16 is fixed. Regarding the rolling motion of the first pinion 14 on the ring gear 16, the first pinion 14 meshes with the ring gear 16. That is, a radially outwardly located external toothing 14a of the first pinion 14 meshes with a radially inwardly located internal toothing 16a of the ring gear 16. The outside diameter of the external toothing 14a is smaller than the root diameter of the internal toothing 16a by at least the height of one tooth. The number of teeth of the external toothing 14a is less than the number of teeth of the internal toothing 16a by one. The tooth geometry both of the external toothing 14a and also of the internal toothing 16a is a partial cycloid or an approximate cycloid shape, i.e. the tooth flanks may possibly be reduced and/or contain intermediate portions, preferably circular arcs.

During the rolling motion of the first pinion 14 on the ring gear 16, the point of the external toothing 14a of the first pinion 14 located in the extension of the eccentricity of the first eccentric 13, i.e. the connecting line between the rotational axis A and the eccentric axis B, is in contact with the current facing point of the internal toothing 16a of the ring gear 16. The contact point might be denoted as the point of rolling contact W. While with known solutions a linear contact between the two components takes place at the point of rolling contact W, for example due to slightly different radii of curvature of the two sets of teeth, according to the exemplary embodiment of the invention a surface contact is provided at the point of rolling contact W. Therefore, for a highly viscous lubricant film on the components, large lubricant gap lengths and small lubricant gap thicknesses may be achieved, which markedly improves the damping effect.

Figure 5:
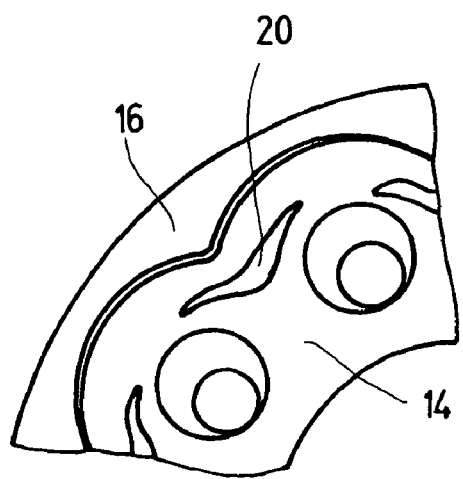
FIG. 5 shows a partial view of a modification with recesses in the pinion.
Figure 6:
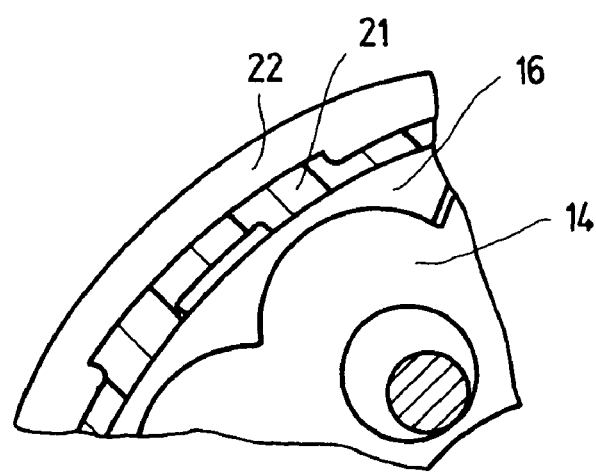
FIG. 6 shows a partial view of a modification with a resilient bed.

In order to achieve the surface contact at the point of rolling contact W, the material of the ring gear 16 radially outside the point of rolling contact W, i.e. the material at least indirectly bearing the external toothing 16a, is at least partially elastically deformable. In the exemplary embodiment (FIG. 1), recesses 20 are provided in the material of the ring gear 16 which create space for receiving the material which is elastically displaced at the point of rolling contact W. The recesses 20 may additionally or alternatively be provided in the first pinion 14 (FIG. 5). The material may naturally also be more flexible, for example by the first pinion 14 being metallic and the ring gear 16 being plastic, with the plastic ring gear 16 preferably being produced as a plastic injection-molded part. In a modification (FIG. 6), the ring gear 16 is metallic, but mounted in a resilient bed 21 inside a fixed housing 22; therefore, overall, a layered, resilient arrangement is provided. The different possibilities for generating the surface contact may also be combined.

In order to tap (e.g., harness) the rolling motion of the first pinion 14 and to compensate for the wobbling portion thereof, a circular sliding gear (surface pressure gear) is configured between the first pinion 14 and the output 18. The circular sliding gear is mounted for rotating about the rotational axis A. Further regarding the circular sliding gear, at least two, in the exemplary embodiment eight, approximately cylindrical guide elements 24 project axially from a disc-shaped base body of the output 18, for example the guide elements 24 may be stamped-out cams or pins. The first pinion 14 has at least two, in the exemplary embodiment eight, guide openings 25 around the eccentric axis B, according to the number of guide elements 24, into which the guide elements 24 engage with clearance. The clearance is slightly greater than double the distance of the eccentric axis B from the rotational axis A. With the rolling motion of the first pinion 14, the output 18 carries out a reduced rotational motion about the rotational axis A.

As compared to the first pinion 14, the second pinion 15, which is driven by the second eccentric 13, carries out the same rolling motion on the common ring gear 16, also with surface contact at a point of rolling contact W. The surface contact between the second pinion 15 and the common ring gear 16 is produced by the same means as for the first pinion 14. By the offset arrangement of the two pinions 14 and 15, the similarly common output 18 is acted upon symmetrically and as a result is free of transverse forces.

In accordance with the exemplary embodiment, the motorized actuator 1 according to FIG. 2 has a second gear train 30 that is arranged, with respect to the rotational axis A, axially offset to the above-described first gear train 10, and the second gear train 30 is attached to the output side of the first gear train 10. The components of the second gear train 30 are configured the same or almost the same as those of the first gear train 10, in particular with regard to the geometric dimensions of the cooperating regions, i.e. the two gear trains 10 and 30 provide the same reduction ratio. For forming a common housing 22, the ring gear 16 extends axially throughout both gear trains 10 and 30, possibly by the radial interposition of the resilient bed 21 and/or steps of (e.g., discontinuities of) the teeth in the axial direction.

The common housing 22 of the motorized actuator 1 also supports the motor 5, which is arranged axially offset on the side (e.g., at the end) of the first gear train remote from the second gear train 30. In the exemplary embodiment, a stator 5a of the motor 5 is fixedly mounted in the housing 22, while a rotor 5b is mounted for rotating about the rotational axis A and is connected fixedly in terms of rotation to the drive 11 of the first gear train 10. The motor 5 is preferably electronically commutated. In this regard, the magnetic field of the stator 5a circulates and the rotor 5b carries permanent magnets 5c which for example contain metals from the group of rare earth metals. The necessary electronics 5d are preferably arranged on the front face of the motor 5 remote from the first gear train 10. The output 18 of the second gear train 30 forms at the same time the entire output of the motorized actuator 1. This output 18 is configured as a hollow shaft. The hollow shaft, which serves as the output 18, extends for the entire axial length of the motorized actuator 1, and is profiled on its inner face for receiving a transmission rod fixedly in terms of rotation. The hollow shaft, which serves as the output 18, has an outer face that rotatably supports both: the rotor 5 with the drive 11 of the first gear train 10; and the output 18 of the first gear train 10 with the drive 11 of the second gear train.

Figure 7:
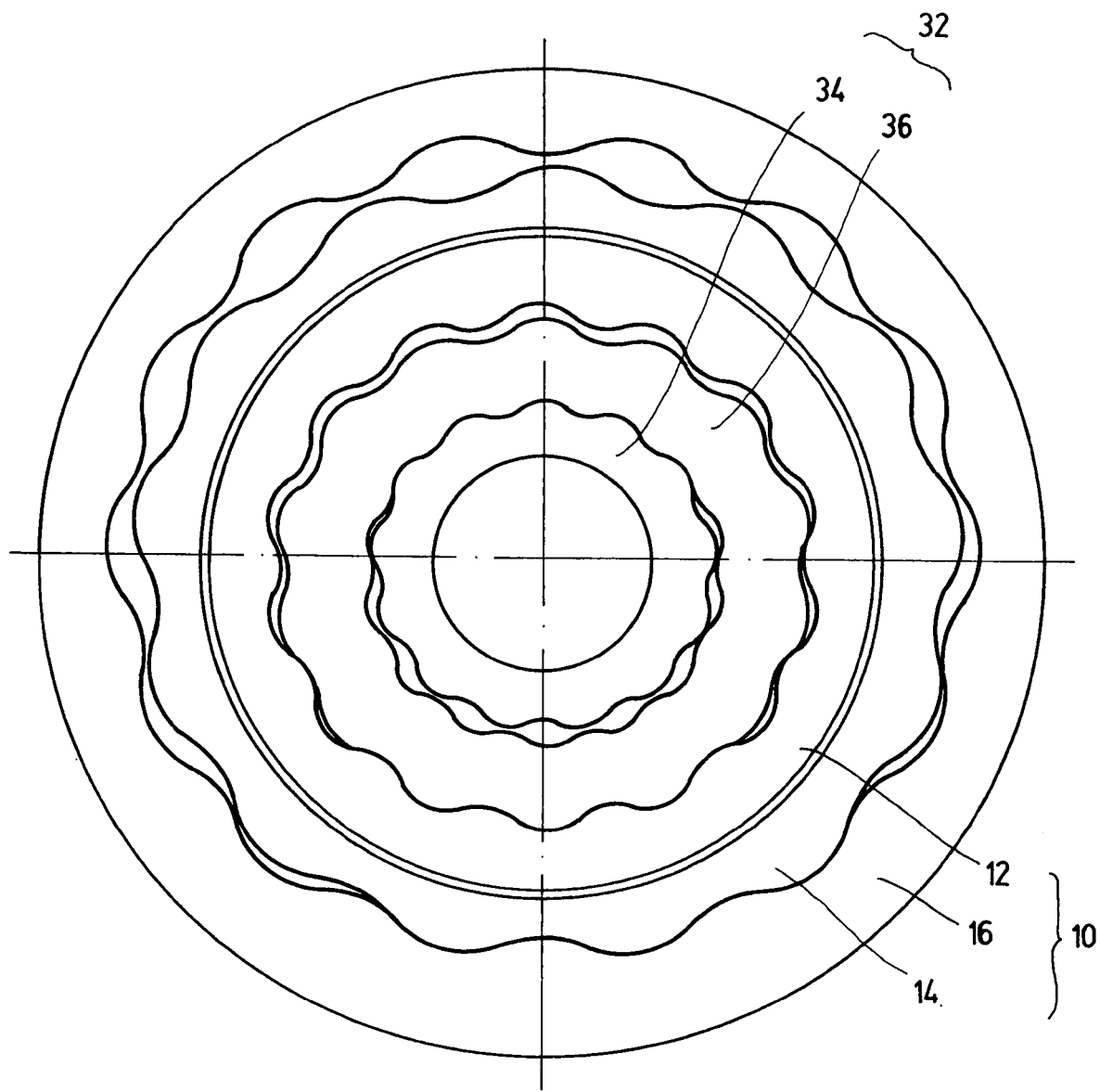
FIG. 7 shows a schematic representation of a modification comprising radially nested gear trains.

In a modified embodiment (FIG. 7), two radially nested gear trains are provided instead of the axially nested gear trains. The radial external first gear train 10 corresponds to the aforementioned gear trains 10 and 30, i.e. a first pinion 14 is driven to create a rolling motion on a fixed ring gear 16, the two cycloid toothings meshing. For the sake of clarity, the output 18 is not shown in the drawings. For driving the first eccentric 12, a modified radial internal gear train 32 is arranged upstream. In the internal gear train 32, on a fixed bearing 34 provided on its (radial) outer face with a cycloid toothing, a ring 36 carries out a rolling motion with a cycloid toothing on its (radial) inner face driven by an eccentric arranged axially offset to the plane of the drawing. As a compensation stage for compensating for the wobbling motion, a further cycloid toothing is provided on the (radial) outer face of the ring 36 which carries out a rolling motion on a cycloid toothing on the (radial) inner face of the first eccentric 12. This compensation stage has, however, a gear ratio of one, as the number of teeth is selected to be the same. With the two reduction gear trains 10 and 32, as described above, measures are implemented for surface contact at the point of rolling contact W of the components rolling against one another.

The motorized actuator 1 according to the invention, for example, may be used for the inclination adjustment of a backrest 42 of the vehicle seat 2 relative to a seat part 43 of the vehicle seat 2. To this end, the motorized actuator 1 drives a load-bearing gear unit located in the force flux between the backrest 42 and the seat part 43, for example a geared fitting such as, for example, as disclosed in DE 199 38 666 A1, the entire disclosure of which is incorporated herein by reference. The motorized actuator 1 may, by forming an integrated adjuster, be completely or partially integrated in the load-bearing gear unit, as is disclosed in DE 10 2004 019 466 A1, the entire disclosure of which is incorporated herein by reference.

The motorized actuator 1 may, however, also be used for height adjustment of the seat part 43, by the motorized actuator 1 for example being effective between a rocker (e.g., a pivotable, supporting linkage), on the one hand, and a seat frame or a seat rail, on the other hand, and also being integrated in the adjuster. Further possibilities for use of the motorized actuator 1 are possible between further components of the vehicle seat 2 which are movable relative to one another.

It will be understood by those skilled in the art that while the present invention has been discussed above with reference to an exemplary embodiment and modifications, various additions, modifications and changes can be made thereto without departing from the spirit and scope of the invention as set forth in the following claims.

That which is claimed:

1. A gear train for an actuator for use in a vehicle, the gear train comprising:
    a drive for being rotated about a rotational axis;
    at least one eccentric for being driven by the drive;
    a ring gear;
    a pinion that is meshed with the ring gear and is for being driven by the eccentric so that, relative to the ring gear, the pinion carries out a rolling motion defining a point of rolling contact; and
    an output for rotating in response to the rolling motion of the pinion,
    wherein the pinion's material that is proximate the point of rolling contact is at least partially elastically deformable, the ring gear's material that is proximate the point of rolling contact is at least partially elastically deformable, or any combination thereof, so that there is surface contact at the point of rolling contact, and
    wherein the pinion comprises recesses configured for making the pinion's material that is proximate the point of rolling contact at least partially elastically deformable, the ring gear comprise recesses configured for making the ring gear's material that is proximate the point of rolling contact at least partially elastically deformable, or any combination thereof.

2. The gear train according to claim 1, wherein material that the pinion is made of differs from material that the ring gear is made of.

3. The gear train according to claim 2, wherein at least one of the pinion and the ring gear is made of plastic.

4. The gear train according to claim 1, wherein the ring gear is mounted in a resilient bed that is adapted for making the ring gear's material that is proximate the point of rolling contact at least partially elastically deformable.

5. The gear train according to claim 1, wherein:
    teeth of the pinion have a tooth geometry that is at least partially cycloidal, and
    teeth of the ring gear have a tooth geometry that is at least partially cycloidal such that there is meshing between the teeth of the pinion and the teeth of the ring gear.

6. The gear train according to claim 1, comprising a compensating apparatus, wherein
    the rolling motion of the pinion includes a wobbling portion,
    the compensating apparatus is for compensating for the wobbling portion while the output rotates in response to the rolling motion of the pinion, and
    the compensating apparatus is selected from the group consisting of
    a circular sliding gear, and
    a compensation stage with a gear ratio of one.

7. The gear train according to claim 1, wherein:
    the pinion is a first pinion;
    the gear train further comprises a second pinion that is axially adjacent to the first pinion, is meshed with the ring gear, and is for being driven so that, relative to the ring gear, the second pinion carries out a rolling motion defining a point of rolling contact;
    the output is for rotating in response to the rolling motion of the second pinion; and
    the first and second pinions are mounted eccentrically relative to the rotational axis, so that the first and second pinions are offset relative to one another in a peripheral direction by 180°.

8. The gear train according to claim 1, wherein:
    the gear train is a first gear train;
    the first gear train is in combination with a second gear train; and
    the first and second gear trains are axially nested with one another, radially nested with one another, or any combination thereof.

9. The gear train according to claim 1, in combination with a motor, wherein the motor has an output side, and the gear train is attached to the output side of the motor in a manner so that the combination is a motorized actuator.

10. A motorized actuator according to claim 9, in further combination with a load-bearing gear unit, wherein the motorized actuator is at least partially integrated in the load-bearing gear unit in a manner so that the further combination is an adjuster for a vehicle seat.

* * * * *